Patented Feb. 28, 1933

1,899,526

UNITED STATES PATENT OFFICE

MAX PHILLIPS, OF WASHINGTON, DISTRICT OF COLUMBIA

VARNISH

No Drawing.    Application filed February 12, 1929.  Serial No. 339,733.

(GRANTED UNDER THE ACT OF MARCH 3, 1883, AS AMENDED APRIL 30, 1928; 370 O. G. 757)

This application is made under the act approved April 30, 1928, and the invention herein described, if patented, may be manufactured and used by or for the Government for governmental purposes without payment to me of any royalty thereon.

Broadly speaking a varnish may be said to consist of certain gums or resins, either natural or synthetic, dissolved in a suitable solvent, as for example, alcohol, benzene, etc., and used to produce a shining, transparent, hard coat or surface.

In the prior art of preparing varnish, comparatively expensive resinous substances, as for example, amber, rosin, copal, dammer, lac, mastic and wax have been used. I have found that lignin when dissolved in a suitable solvent, as for example a mixture of alcohol and benzene, (1 vol. 95% ethyl alcohol and 1 vol. benzene) makes an excellent varnish, which when applied to wood gives a shining, transparent, water-proof and acid-proof coat as a surface.

Lignin is widely distributed in the plant kingdom, occurring in the cell structure of the woody tissue of plants. It is insoluble in water and practically insoluble in ether, petroleum ether, chloroform, carbon tetrachloride, ethyl acetate, methyl alcohol, and amyl alcohol, when any of these substances is used separately, and not in combination or mixture with other substances mentioned. It is slightly soluble in certain organic solvents, when used separately, such as ethyl acetate, benzene, acetic acid, and toluene. It is soluble in certain other organic solvents, when used separately, such as nitro-benzene and pyridine. It is readily soluble in mixtures of any two or more organic solvents. For example, it is very soluble in mixtures of ethyl alcohol and benzene (1 vol.: 1 vol.); methyl alcohol and benzene (1 vol.: 1 vol.); isopropyl alcohol and benzene (1 vol.: 1 vol.); ethyl alcohol and acetone (1 vol.: 1 vol.); ethyl alcohol and ethyl acetate (1 vol.: 1 vol.); ethyl alcohol and amyl acetate (1 vol.: 1 vol.); ethyl alcohol, acetone, and benzene (1 vol.: 1 vol.: 1 vol.); ethyl alcohol, furfural and acetone (1 vol.: 1 vol.: 1 vol.).

While in the examples above given, equal proportions of the several organic solvents in the combinations or mixtures of two or more organic solvents are given, I do not limit myself to these proportions, wide variations between the proportions of the organic solvents employed in the combinations or mixtures being possible of use with good results.

Lignin is very resistant even to concentrated hydrochloric acid and also to 50 per cent sulfuric acid. It is soluble in aqueous solution of sodium hydroxide, potassium hydroxide, sodium carbonate, potassium carbonate and ammonia, and it may be precipitated from the alkaline solution by the addition of acid.

For the isolation of lignin I proceed as follows: Corn cobs are placed in a suitable digester and aqueous 1½ per cent sodium hydroxide solution is added in sufficient amount to completely submerge the cobs. This is refluxed for 6 hours or it may be heated in an autoclave for 4 hours under 8 atmospheres of pressure. The mass is then filtered, and the corn cobs pressed out. The resulting solution is made acid with 50 per cent sulfuric or hydrochloric acid and the mixture heated to boiling, whereupon the lignin separates out in a granular form suitable for filtration. The lignin is filtered off, washed with water and dried at 70 to 80° C. in vacuo.

Whereas I have described the method of isolating lignin from corn cobs, I do not limit myself to lignin prepared by this particular method. Lignin produced by any of the well-known methods such as the Willstatter method, sulphite process, soda and sulphate process may be used in the preparation of my varnish. In place of corn cobs, wood, straw, stalks, or other plant substance rich in lignin may be used.

Several examples showing how I prepared a varnish from lignin are given herewith:

(1) I dissolved one part of lignin in four to five parts of an alcohol-benzene mixture (1 vol. of ethyl alcohol and 1 vol. of benzene). This varnish when applied to wood gave a shining, transparent and durable surface.

(2) One part of lignin was dissolved in an alcohol-acetone mixture (1 vol. of ethyl alcohol and 1 vol. of acetone). This gave a polished and durable surface to the wood.

(3) One part of lignin was dissolved in a methyl alcohol-benzene mixture (1 vol. of methyl alcohol and 1 vol. of benzene). The appearance of the varnish when applied to wood was similar to that described under Example (2).

(4) One part of lignin was dissolved in an acetone-ethyl alcohol-benzene mixture (one volume of each solvent).

(5) One part of lignin was dissolved in an alcohol-ethyl acetate mixture (1 vol. of ethyl alcohol and 1 vol. of ethyl acetate). The appearance of the surface of the wood when either this varnish or the one given under Example (4) was applied to it was similar to that described under Example (2).

While I have described above a varnish consisting solely of lignin as the base, I do not wish to limit myself to a varnish consisting solely of lignin dissolved in suitable solvents as set forth above, but on the contrary desire that my invention shall be understood to include lignin and a solvent alone and also mixed or combined with other varnish bases, gums and resins.

I claim:

A varnish comprising lignin substantially identical with that produced by digesting corn cobs in alkali solution, reacting the resulting solution with sulfuric or hydrochloric acid to form a granular precipitate, and a solvent mixture of two or more ingredients selected from the group consisting of ethyl alcohol, methyl alcohol, isopropyl alcohol, benzene, acetone, ethyl acetate. amyl acetate, and furfural.

MAX PHILLIPS.